US012466642B2

(12) United States Patent
McNeilus et al.

(10) Patent No.: US 12,466,642 B2
(45) Date of Patent: Nov. 11, 2025

(54) ROBUST GRABBER ARM FOR REFUSE COLLECTION VEHICLE

(71) Applicant: Con-Tech Manufacturing, Inc., Dodge Center, MN (US)

(72) Inventors: Grant McNeilus, Dodge Center, MN (US); Garwin McNeilus, Dodge Center, MN (US); Brian Meldahl, Dodge Center, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 405 days.

(21) Appl. No.: 18/069,048

(22) Filed: Dec. 20, 2022

(65) Prior Publication Data

US 2023/0129820 A1 Apr. 27, 2023

Related U.S. Application Data

(63) Continuation-in-part of application No. 17/656,725, filed on Mar. 28, 2022, now Pat. No. 11,884,486.

(60) Provisional application No. 63/261,367, filed on Sep. 20, 2021.

(51) Int. Cl.
*B65F 3/04* (2006.01)

(52) U.S. Cl.
CPC .................................... *B65F 3/041* (2013.01)

(58) Field of Classification Search
CPC .......... B65F 3/041; B65F 3/043; B65F 3/045; B65F 3/046; B65F 2003/023
See application file for complete search history.

(56) References Cited

U.S. PATENT DOCUMENTS

| | | | |
|---|---|---|---|
| 4,401,407 A | 8/1983 | Breckenridge | |
| 4,708,570 A * | 11/1987 | Smith | B65F 3/04 414/408 |
| 4,898,510 A | 2/1990 | Weber | |
| 5,020,844 A | 6/1991 | Pickrell | |
| 5,201,235 A | 4/1993 | Sutton | |
| 5,209,537 A | 5/1993 | Smith et al. | |
| 5,447,409 A | 9/1995 | Grunes et al. | |
| 5,482,180 A | 1/1996 | Smith et al. | |
| 5,613,822 A | 3/1997 | Gasparini et al. | |
| 5,720,589 A | 2/1998 | Christenson et al. | |
| 5,772,385 A | 6/1998 | Huntoon et al. | |
| 5,833,428 A * | 11/1998 | Szinte | B65F 3/041 414/408 |
| 5,833,429 A | 11/1998 | McNeilus et al. | |
| 5,988,970 A | 11/1999 | Holtom | |
| 6,474,928 B1 | 11/2002 | Christenson | |

(Continued)

FOREIGN PATENT DOCUMENTS

WO 96/28369 9/1996

*Primary Examiner* — Jonathan Snelting
(74) *Attorney, Agent, or Firm* — Craig J. Lervick; Larkin Hoffman Daly & Lindgren, Ltd.

(57) ABSTRACT

A grabber arm mechanism for use as part of a refuse collection vehicle has a mismatched pair of grabber fingers which are both arcuate, with a first grabber finger being longer than a second grabber finger. Due to the mismatch in size in the first grabber finger and the second grabber finger, the grabber mechanism is capable of handling a larger range of container sizes thereby providing increased capabilities for a refuse collection vehicle. The configuration of the fingers (mismatched) also provides advantages when dealing with smaller containers.

18 Claims, 16 Drawing Sheets

(56) References Cited

U.S. PATENT DOCUMENTS

| | | | |
|---|---|---|---|
| 6,494,665 | B1 | 12/2002 | Bingman |
| 6,551,046 | B1 | 4/2003 | Dorrington |
| 6,722,839 | B2 | 4/2004 | Bingman |
| 9,403,641 | B1 | 8/2016 | Ghibaudo |
| 9,598,235 | B2 | 3/2017 | Vasilescu et al. |
| 9,834,377 | B1 | 12/2017 | Hayes et al. |
| 9,912,130 | B1 | 3/2018 | Burns |
| 9,956,691 | B1 | 5/2018 | Pentzer et al. |
| 10,221,012 | B2 | 3/2019 | Hund |
| D846,611 | S | 4/2019 | Chi |
| 10,899,538 | B2 | 1/2021 | Nelson et al. |
| 10,994,929 | B2 | 5/2021 | Haddick et al. |
| 11,001,440 | B2 | 5/2021 | Rocholl et al. |
| D967,220 | S | 10/2022 | Bangalore Srinivas et al. |
| 11,884,486 | B2 | 1/2024 | Mcneilus et al. |
| 2001/0038175 | A1 | 11/2001 | Nagai et al. |
| 2003/0077156 | A1 | 4/2003 | Bingman |
| 2004/0113343 | A1 | 6/2004 | Mcintosh et al. |
| 2013/0285401 | A1 | 10/2013 | Price et al. |
| 2016/0159571 | A1 | 6/2016 | Arrez |
| 2017/0291765 | A1 | 10/2017 | Kouri |
| 2017/0297818 | A1 | 10/2017 | Goedken et al. |
| 2017/0349375 | A1 | 12/2017 | Hund, Jr. |
| 2020/0102145 | A1 | 4/2020 | Nelson et al. |
| 2020/0262328 | A1 | 8/2020 | Nelson et al. |
| 2020/0346856 | A1 | 11/2020 | Rocholl et al. |
| 2020/0346859 | A1 | 11/2020 | Buege et al. |
| 2020/0346860 | A1 | 11/2020 | Buege et al. |
| 2023/0086945 | A1 | 3/2023 | Mcneilus et al. |
| 2023/0129820 | A1 | 4/2023 | Mcneilus et al. |

* cited by examiner

ROBUST GRABBER ARM FOR REFUSE COLLECTION VEHICLE

BACKGROUND

Side load refuse collection trucks are widely used in today's society and can be seen operating in many cities, towns and rural areas. These refuse collection trucks include a grabber arm that is located on the curb side of a vehicle, allowing an operator to simply position the vehicle next to refuse containers, and use the grabber arm to retrieve and dump the contents into a refuse collection hopper. While convenient, the grabber arm is a complex device, which typically includes several moving parts and requires maintenance at several locations, including hinge points, connection points, and hydraulic actuators. Although many such systems exist, the durability and maintainability of these mechanisms is a primary concern. Each particular component of the grabber arm can be subjected to severe stresses, especially when the grabber arm is being extended a considerable distance, and is required to carry significant loads. In addition, since the grabber arm is being continuously used throughout any particular operating day and goes through many grabbing cycles, each of the wear points (bearings, pins, bushings, etc.) is subject to considerable wear. Also, refuse collection trucks operate in all types of conditions, often including dirty, muddy, cold, or harsh environments. As such, it is desirable to create a grabber arm that is robust, easily serviceable, and capable of efficiently operating in these conditions.

As mentioned above, serviceability and maintenance of the grabber arm is a primary concern. In many current systems, multiple arm components are coordinating with one another, and access to service points is not always convenient. Typically, such systems are designed in a space saving format, resulting in parts/components being nested with one another, and thus concealing many components. In addition, the type of maintenance required is often unpredictable and varied, thus the ability to remove and/or replace parts is important. This is particularly true for pins, bearings and coupling components. As such, knowledge of known wear points, and consideration of accessibility is a significant concern, and one that has not always been considered in the past.

SUMMARY

By carefully designing each component of a side load grabber arm with service and maintenance in mind, a grabber system is achieved which is robust, serviceable, efficient, and effective. The grabber arm generally comprises a mounting bracket (which is attachable to a portion of the refuse collection truck), an inner arm, an outer arm, and a grabber mechanism. The inner arm and outer arm are both designed to have two parallel frame members connected by at least one central cross piece. Although using two parallel frame members or beam members necessarily requires the use of additional structures and components, including additional hinge points, bushings, hinge pins and bearings, the resulting structure provides a wider stance, which is very rigid and stable. In addition, each of the hinge points can be positioned or oriented so that they are easily accessible for service purposes. Further, common components, such as common bearings and pins, are utilized throughout the robust grabber arm thus making replacement and service easy and convenience. The grabber mechanism itself is also carefully designed to be driven by a minimum number of hydraulic actuators and thus provides a consistent, repeatable, and robust grabbing motion, which is capable of efficiently handling refuse collection bins. Additionally, certain alternatives for the grabber mechanism are available which will provide the ability to handle a variety of waste containers.

BRIEF DESCRIPTION OF THE DRAWINGS

Further details of the various embodiments will be apparent from following description, in conjunction with the drawings, in which.

DESCRIPTION

The following detailed description outlines certain features, advantages and characteristics of one embodiment of a robust grabber arm 10 for use as a component of a refuse collection vehicle 16. Although various references throughout the following detailed description are made to "inner," "outer," "upper," "lower," "front," "back," "first," "second," and other relative terms, it will be understood that these references are relative and are not to be construed as limiting. Additionally, various components can be substituted, replaced or may be identified differently at times throughout this detailed description.

Figure 1:
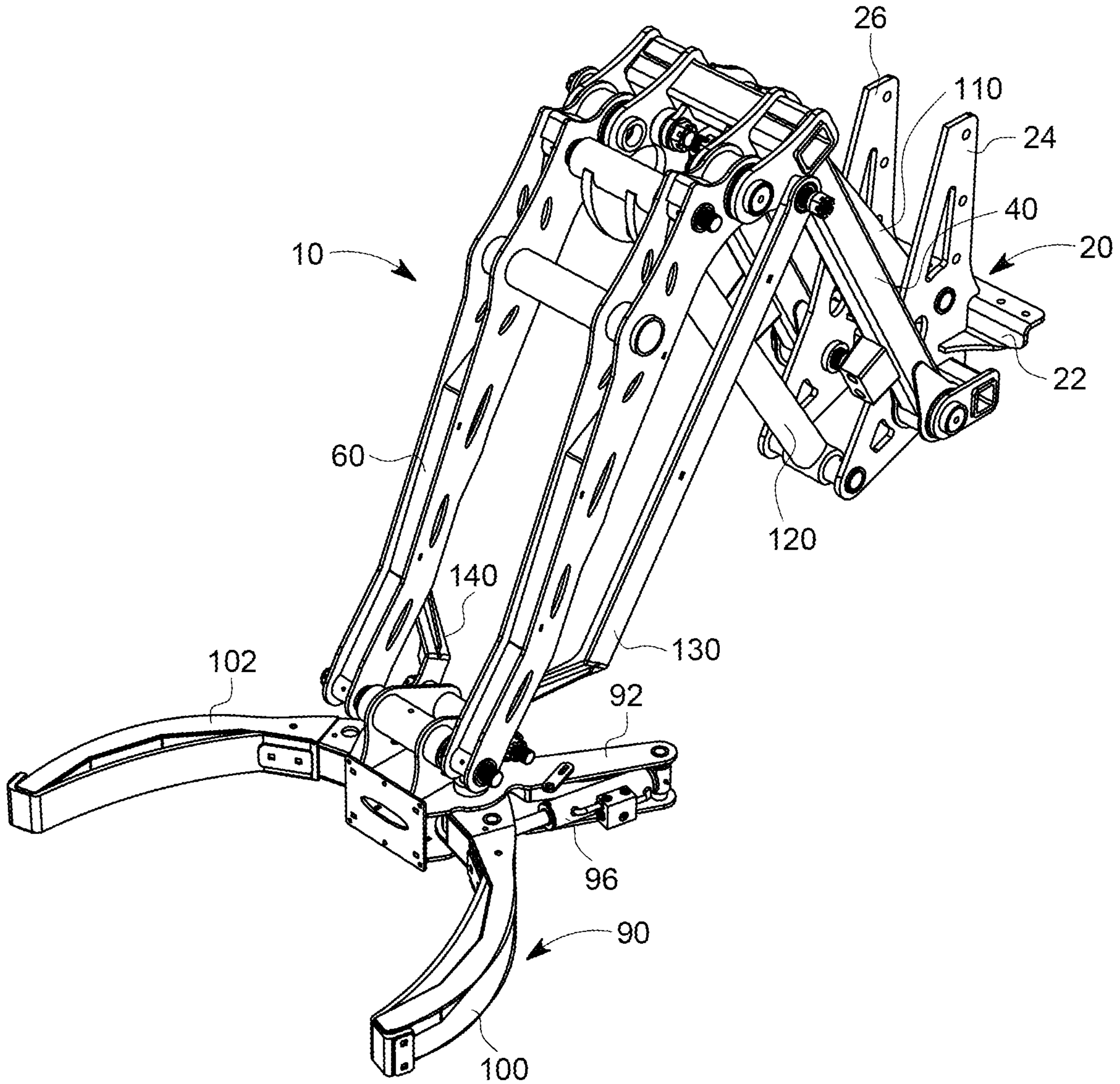
FIG. 1 is a perspective view of an embodiment of the robust grabber arm.

Turning now to FIG. 1, a perspective view of robust grabber arm 10 is illustrated. As shown, robust grabber arm 10 is in a partially extended position and a related refuse collection vehicle 16 is not shown. As will be discussed in further detail below, when in use robust grabber arm 10 is attached to refuse collection vehicle 16, it is continuously movable between three primary positions, including a stowed position, a reach (or extended) position, and a dump position.

Generally, robust grabber arm 10 comprises a mounting bracket 20, which is uniquely configured for attachment to refuse collection vehicle 16. Robust grabber arm 10 further comprises an inner arm 40, which is hingedly connected to mounting bracket 20, an outer arm 60, which is hingedly attached to inner arm 40, and a first grabber mechanism 90. Robust grabber arm 10 further includes various components to help control movements and maintain desired alignments. These components generally comprise a first drive cylinder 110, a second drive cylinder 120, a first alignment link 130 and a second alignment link 140. As will be appreciated, both first drive cylinder 110 and second drive cylinder 120 are hydraulic cylinders which are coupled to hydraulic valves and related components used to control movement. First alignment link 130 and second alignment link 140 are coupled between inner arm 40 and first grabber mechanism 90 to maintain desired alignment during operation. In addition, a first central coupling link 150 and a second central coupling link 160 are rotatably attached to outer arm 60 and inner arm 40, respectively. In this particular embodiment, first coupling link 150 and second coupling link 160 are used to provide an intermediate connection point for one end of second drive cylinder 120.

As suggested above, first grabber mechanism 90 is coupled to an outer end of outer arm 60. In this embodiment, first grabber mechanism 90 generally includes a main grabber bracket 92 utilized to support and accommodate operation of first grabber finger 100 and second grabber finger 102. A third drive cylinder 96 (or grabber cylinder 96) is part of first grabber mechanism 90, and is utilized to create appropriate movement of first grabber finger 100 and second grabber finger 102. As will be further discussed below, first grabber finger 100 and second grabber finger 102 are both rotatably coupled to grabber bracket 92, and include an meshed gear mechanism 111 (made up of first gear structure 101 and second gear structure 103) to ensure that these two components consistently move in conjunction with one another. As shown, first grabber finger 100 is coupled to grabber bracket 92 in a manner that allows rotation about a first axis or hinge point 108. Similarly, second grabber finger 102 is coupled to grabber bracket 92 in a manner that allows rotation about a second axis or hinge point 109. First axis 108 and second axis 109 are parallel to and spaced apart from one another. Although pins or bearings rotatably coupling first grabber finger 100 and second grabber finger 102 to grabber bracket 92 are accessible, meshed gear mechanism 111 is hidden or generally shielded by grabber bracket 92.

In the disclosed embodiment, inner arm 40 and outer arm 60 are specifically designed to form a robust mechanical structure, while also allowing for easy serviceability of components. As shown, inner arm 40 includes a first inner arm beam member 42 and a second inner arm beam member 44 which are generally parallel with one another. At an upper end of both first inner arm beam member 42 and second inner arm beam member 44, a coupling tube 46 connects these two beam members to one another. In this embodiment coupling tube 46 is a rectangular tube element. Similarly, first inner arm beam member 42 and second inner arm beam member 44 are rectangular tube elements, each formed of ⅜-inch steel. As will be appreciated, each of these components provide considerable strength and durability.

Figure 2:
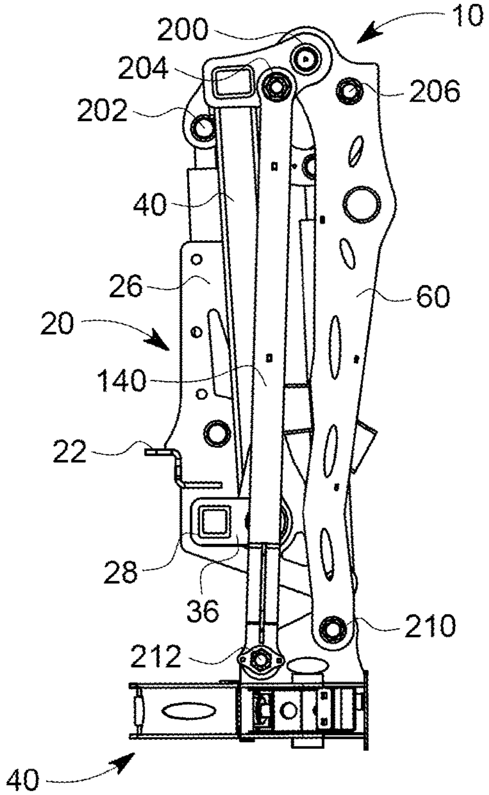
FIG. 2 is a side view of the robust grabber arm while in the stowed position.
Figure 3:
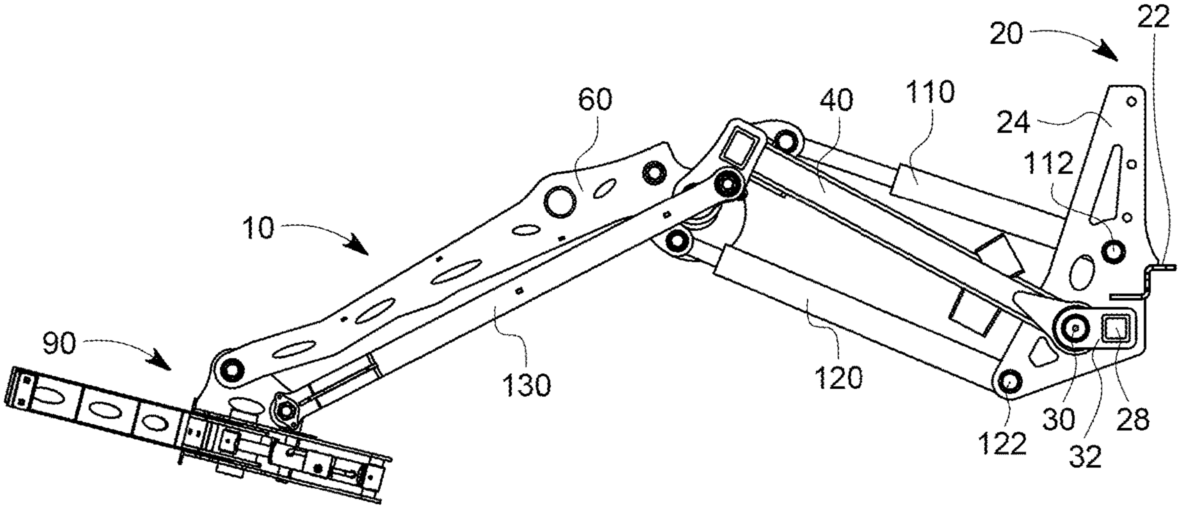
FIG. 3 is a side view of the robust grabber arm while in the extend/pick-up position.
Figure 4:
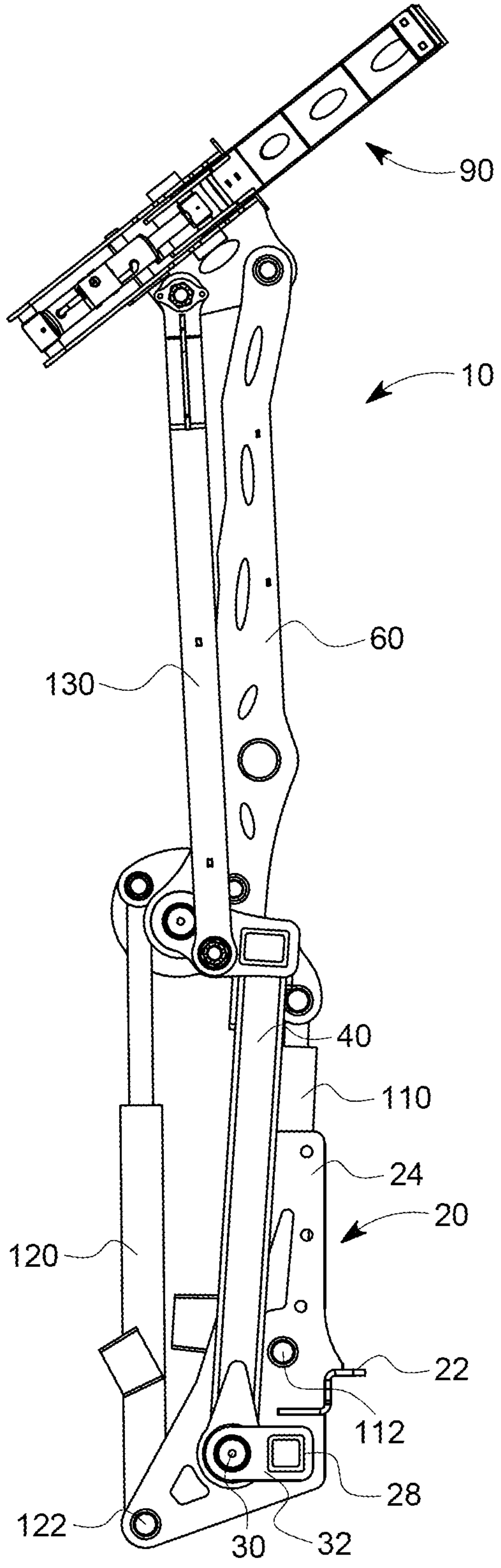
FIG. 4 is a side view of the robust grabber arm while in the dumping position.
Figure 5:
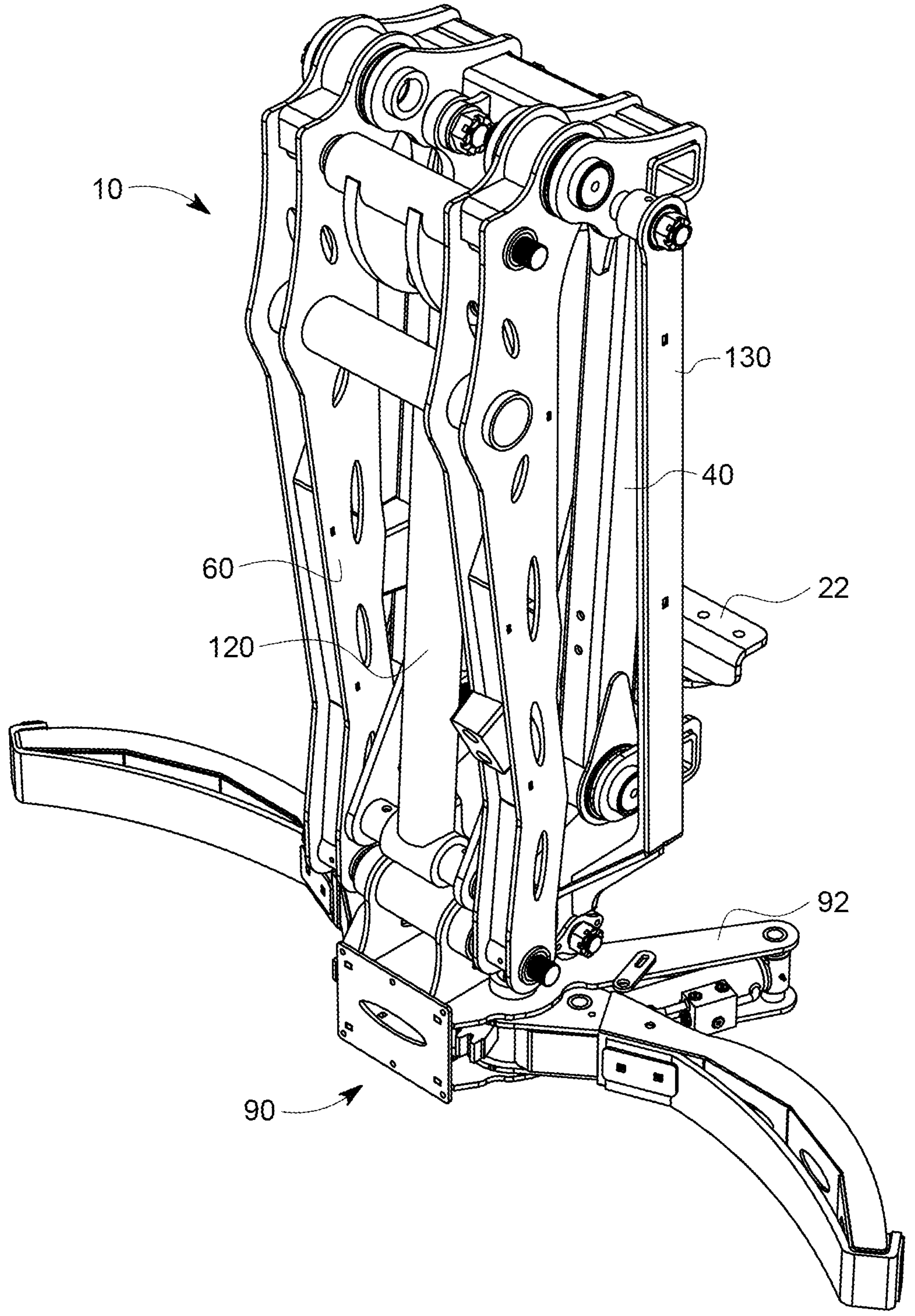
FIG. 5 is a perspective view of the robust grabber arm in the stowed position.

As generally discussed above, robust grabber arm 10 is configured to be movable between three primary positions when mounted to a refuse collection vehicle 16. Referring now to FIGS. 2-4, these three positions are better illustrated, along with showing the orientation of compounds during operation. As shown when in a stowed position (FIG. 2), the components of robust grabber arm 10 are positioned to be substantially upright so they can be stowed adjacent to refuse collection truck 16, so as to avoid interference while traveling to collection locations. While in the reach position (FIG. 3), robust grabber arm 10 is configured so it is able to grab refuse containers (not shown) by operating first grabber mechanism 90. Similarly, while in the dump position (FIG. 4), robust grabber arm 10 is moved so that grabber mechanism has been raised and tilted, thus allowing any contents within a carried refuse container to be dumped into a collection hopper carried by the refuse collection vehicle 16.

Again, robust grabber arm 10 includes mounting bracket 20 configured to be securely mounted to the frame, body or other supporting structure of refuse collection vehicle 16. In this embodiment, mounting bracket 20 includes a horizontal support 22, a first upright plate 24 and a second upright plate 26. Horizontal support 22 is configured to extend between first upright plate 24 and second upright plate 26 to provide rigidity thereto. In addition, a rectangular coupling tube 28 helps to provide further rigidity, and helps to support other necessary connections. Most significantly, rectangular coupling tube 28 helps to provide further support for an inner arm coupling pin 30. This additional support is achieved by utilizing a surrounding plate 32 which is securely connected to rectangular coupling tube 28. A similar second surrounding plate 36 and second inner arm coupling pin 34 exists on an opposite side of mounting bracket 20. As will be further discussed below, this provides a secure and robust connection structure allowing inner arm member 40 to be rotatably coupled to mounting bracket 20. In addition, mounting bracket 20 further accommodates a first drive cylinder connecting pin 112 and a second drive cylinder connecting pin 122, which are used to couple respective portions of first drive cylinder 110 and second drive cylinder 120.

Figure 9:
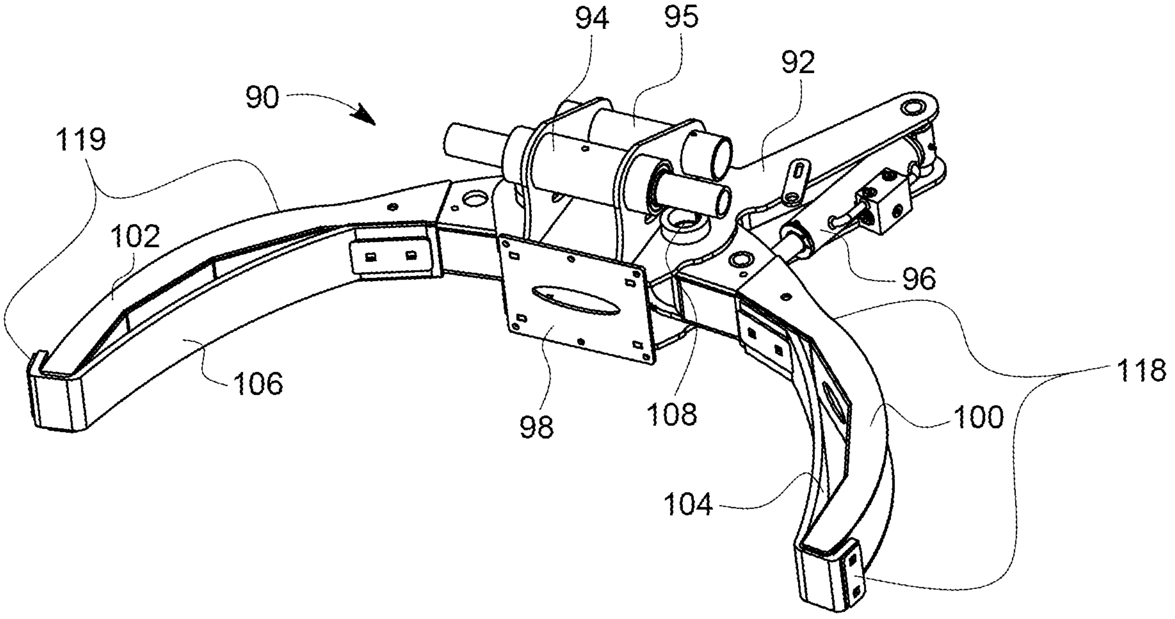
FIG. 9 is a perspective view of the grabber mechanism.

As generally mentioned above, robust grabber arm 10 includes a first grabber mechanism 90 which is uniquely configured to retrieve and dump refuse containers. A detailed perspective view of first grabber mechanism 90 is illustrated in FIG. 9. As shown, first grabber mechanism 90 includes grabber bracket 92, drive mechanism 96, first grabber finger 100 and second grabber finger 102. To accommodate connection to other components, and specifically connection to outer arm 60, first alignment link 130 and second alignment link 140, grabber bracket 92 includes a primary bushing 94 and a secondary bushing 95. Both primary bushing 94 and secondary bushing 95 are configured to receive and support related connecting pins. In addition, first grabber mechanism 90 includes a front plate 98 which can function as a main contact point when retrieving refuse containers. Front plate 98 may also be configured to support and accommodate the operation of various sensors such a sonar or proximity sensors of various types (not shown).

In the illustrated embodiment, first grabber finger 100 has a first resilient member 104 attached thereto, while second grabber finger 102 also includes a second resilient member 106 attached thereto. It is also noted that both first grabber finger 100 and second grabber finger 102 are configured in a curved or arcuate manner. Stated differently, first grabber finger 100 is configured to have at least one curved or acuate portion 118, while second grabber finger also has at least one arcuate or curved portion 119. Although the embodiment illustrated in FIGS. 1-11 generally show first grabber finger 100 and second grabber finger 102 as having a substantially smooth curved outer surface and a segmented inner surface made up of a number of planar surfaces or segments, several variations are possible to generate the generally curved or arcuate portions.

In this embodiment, first resilient member 104 and second resilient member 106 are rubber coated fabric strips or reinforced rubber elements that can conform to and grab refuse containers and are attached in a manner to span across the inner front side of the first grabber finger 100 and second grabber finger 102, respectively. As will be appreciated, each of these components help to grab and contain the refuse container when the grabber arms are moved to surround the outer walls of the refuse container. In operation, drive cylinder 96 will direct movement of first grabber finger 100 and second grabber finger 102. As seen, first grabber finger 100 is connected to grabber bracket 92 at a hinge point 108. A similar hinge point 109 exists to support second grabber finger 102.

Figure 10:
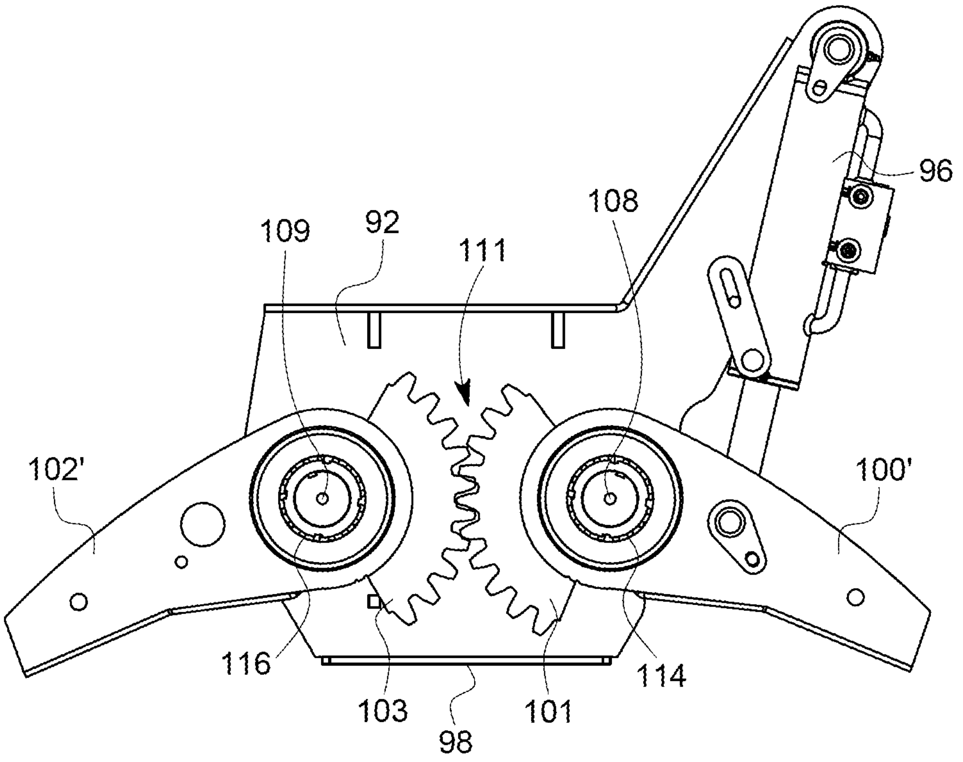
FIG. 10 is a view of first and second grabber arms which form a portion of grabber mechanism.

As better shown in FIG. 10, a cooperating engagement structure 111 is used to create controlled movement of the first grabber finger 100 and the second grabber finger 102. In this embodiment the cooperating engagement structure 111 is a meshed gear mechanism which is included as an integral portion of first grabber finger 100 and second grabber finger 102, which will cause these two elements to move in unison with one another. The operation of drive mechanism 96 will cause movement of the first grabber finger 100, which in turn will easily create the desired grabbing motion for first grabber finger 100 and second grabber finger 102. More specifically, FIG. 10 illustrates a first portion 100' of first grabber finger 100, which is rotatably coupled to grabber bracket 92 via a first bearing 114 (here, first portion 100' is configured to support an extension to form first grabber finger 100). Similarly, a first portion 102' of second grabber finger 102 is shown as being rotatably coupled to grabber bracket 92 via a second bearing 116. Again, operation of drive mechanism 96 will cause rotation of first grabber finger 100 about hinge point 108 and rotation of second grabber finger 102 about hinge point 109. In this embodiment, first portion 100' of first grabber finger 100 has a first gear structure 101, while first portion 102' of second grabber finger 102 has a related second gear structure 103, with first gear structure 101 and second gear structure 103 meshing with one another to cause coordinated movement of first grabber finger 100 and second grabber finger 102.

Referring again to FIGS. 1, 5 and 6, robust grabber arm 10 also includes first alignment link 130 and second alignment link 140. As indicated, each of these elements are coupled at a first end to inner arm 40, and at a second end to grabber bracket 92. Based upon the positioning and configuration of these elements and their relationship with other components, these elements will assist to maintain alignment of first grabber mechanism 90 during various stages of operation. The inclusion of first alignment link 130 and second alignment link 140 eliminates the need for additional drive mechanisms to control the positioning of first grabber mechanism 90.

Again, robust grabber arm 10 includes first coupling link 150 and second coupling link 160 which are also uniquely configured to assist in the controlled movement of first grabber mechanism 90. As shown, first coupling link 150 has a central pin 152, and a pair of connecting tabs 154 and 156. First coupling link 150 is a unitary element, with coupling tabs 154 and 156 rigidly connected to a main body 151.

Figure 6:
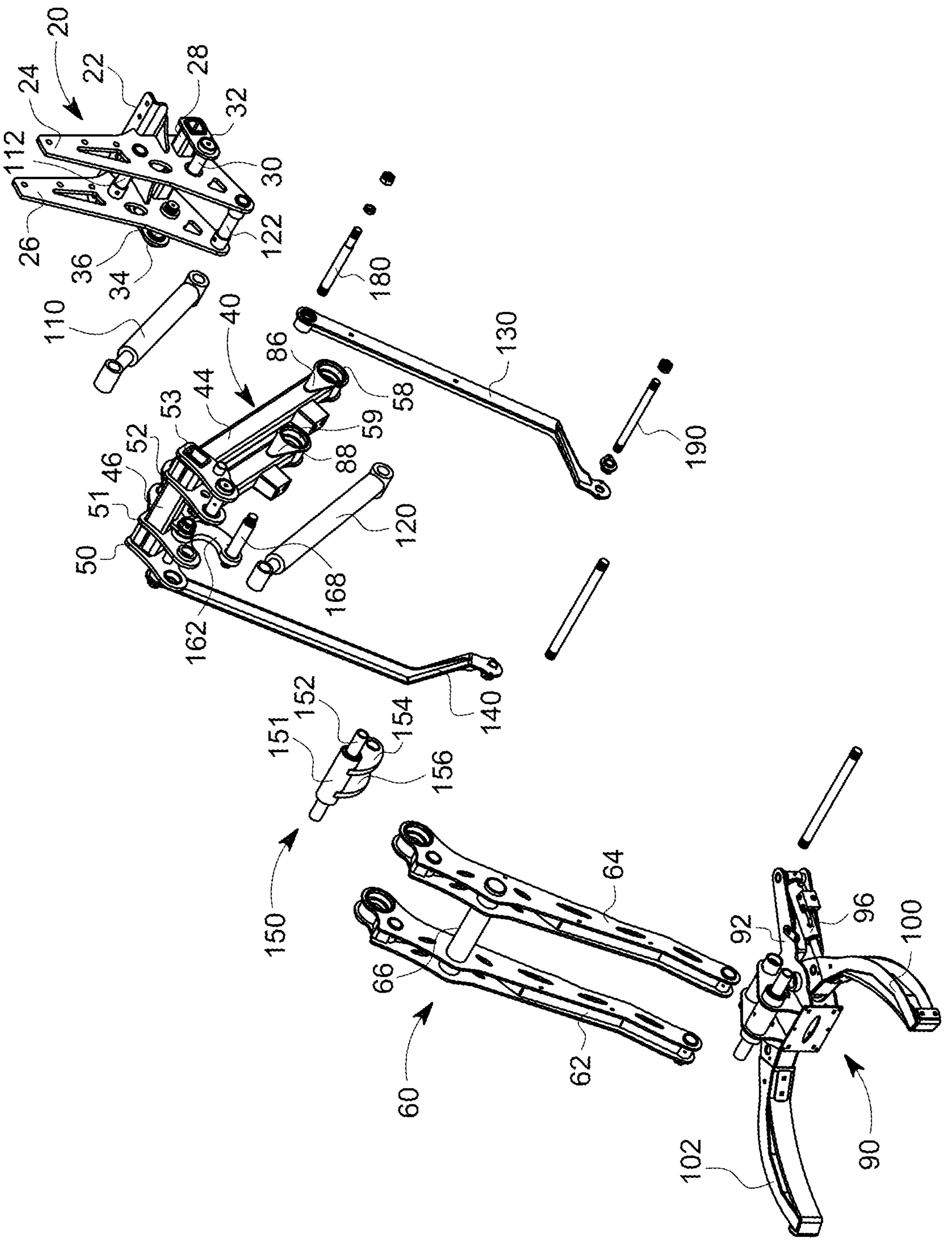
FIG. 6 is an exploded view of several components making up the robust grabber arm.
Figure 7:
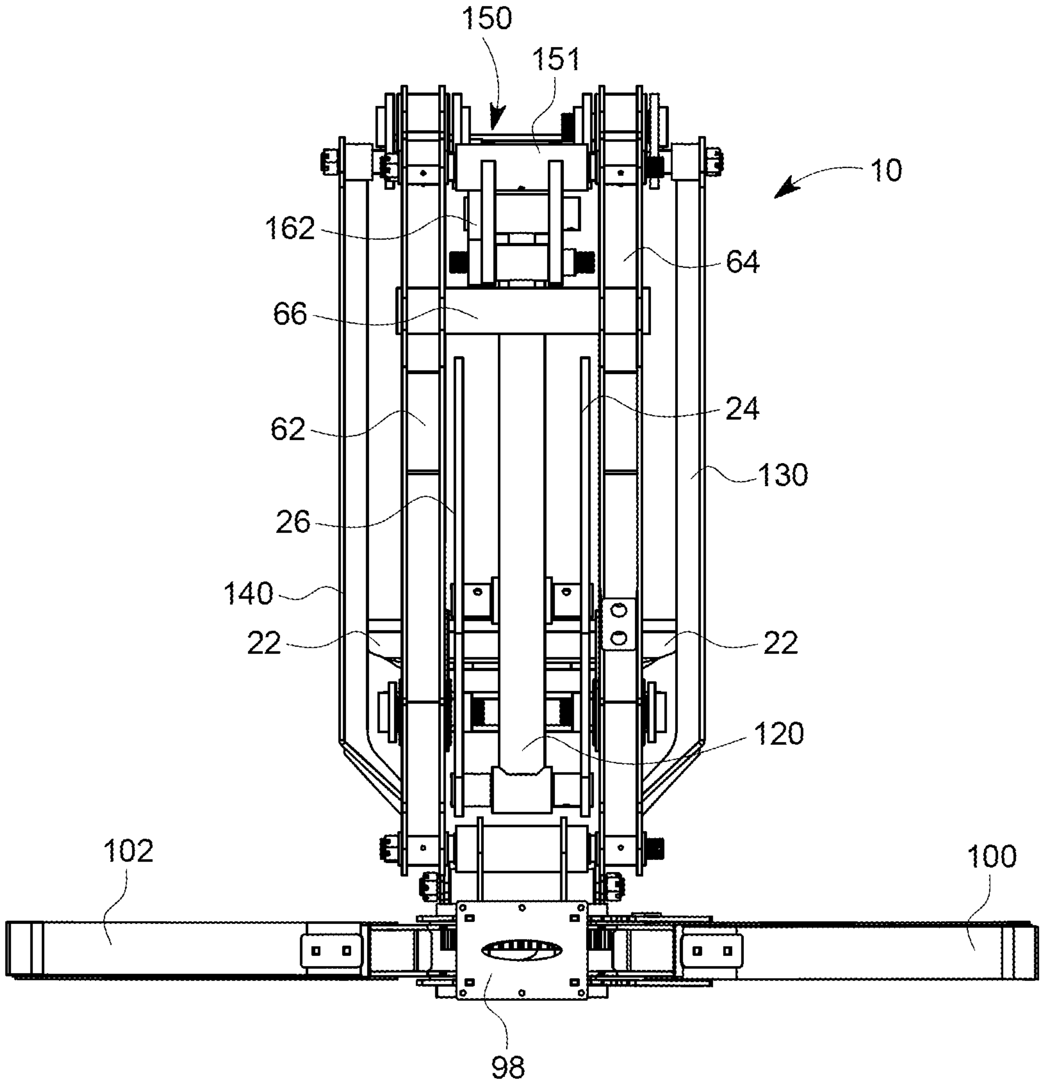
FIG. 7 is a front view of robust grabber.
Figure 8:
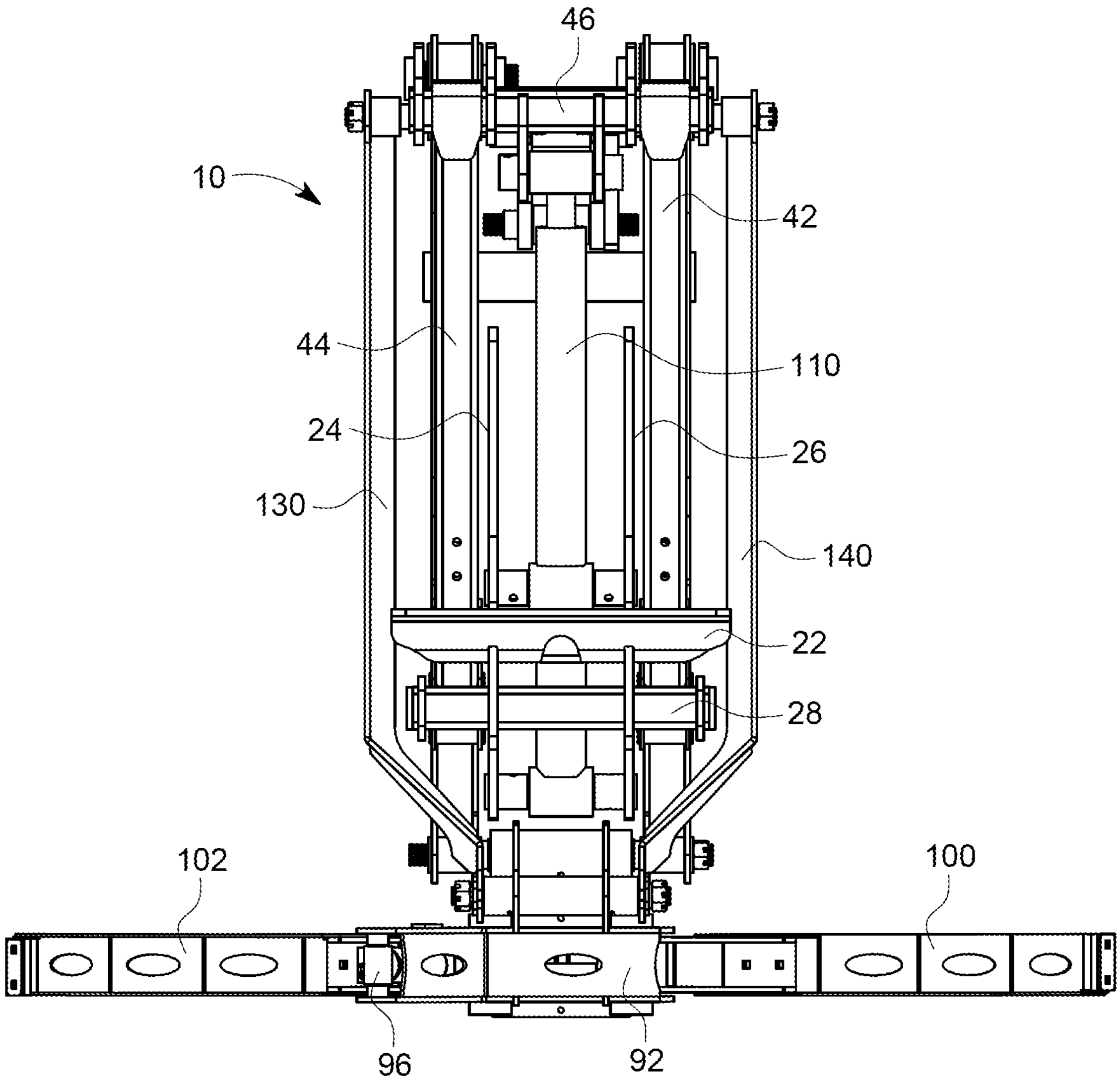
FIG. 8 is a rear view of the robust grabber.

Second coupling link 160 comprises a first coupling plate 162 and a second coupling plate 164. These coupling plates are configured to support connection to first coupling link 150 via a connection pin 168. As shown in FIG. 6, second coupling plate 164 is not present, to allow a better viewing of pin 168. Pin 168 is aligned and configured to moveably couple first coupling link 150, second coupling link 160 and second drive cylinder 120 at a central portion of robust grabber 10.

In the disclosed embodiments, special care is taken to utilize commonly sized connecting pins and heavy-duty bearings throughout. As one example, heavy duty 2-inch bearings are used at several locations, such as the central point 200, the grabber arm hinge points 108, and the main connection point between mounting bracket 20 and inner arm 40. In addition, easy change links and pins are utilized at other locations. As an example of this design approach, FIG. 6 illustrates a plurality of easy change pins 180, 182 which are selected to be common sizes. In this manner, service is simplified by allowing for common parts. Similar commonality is achieved by utilizing common sizes for bearings and bushings.

As will be apparent from the drawings, each of the service locations are easily accessible, which will allow for removal and/or maintenance of bearings, links and pins, as necessary. The arrangement of service locations and various components is best illustrated in FIGS. 2-4, which present side views of robust grabber arm 10 in various positions. While in the stored position, hinge points 200, 202, 204 and 206 are all easily accessible for service operations. In addition, grabber hinge points 210 and 212 are also accessible from the side. In addition, when moved to an intermediate position, slightly away from refuse collection vehicle 16 (i.e. in the position shown in FIG. 1), pins 112 and 122 (used for connection to housing bracket 20) are also easily accessible. Based upon this configuration, it will be fairly straightforward for service personnel to access these positions, and replace or service any pins or bearings needing attention.

Figure 12:
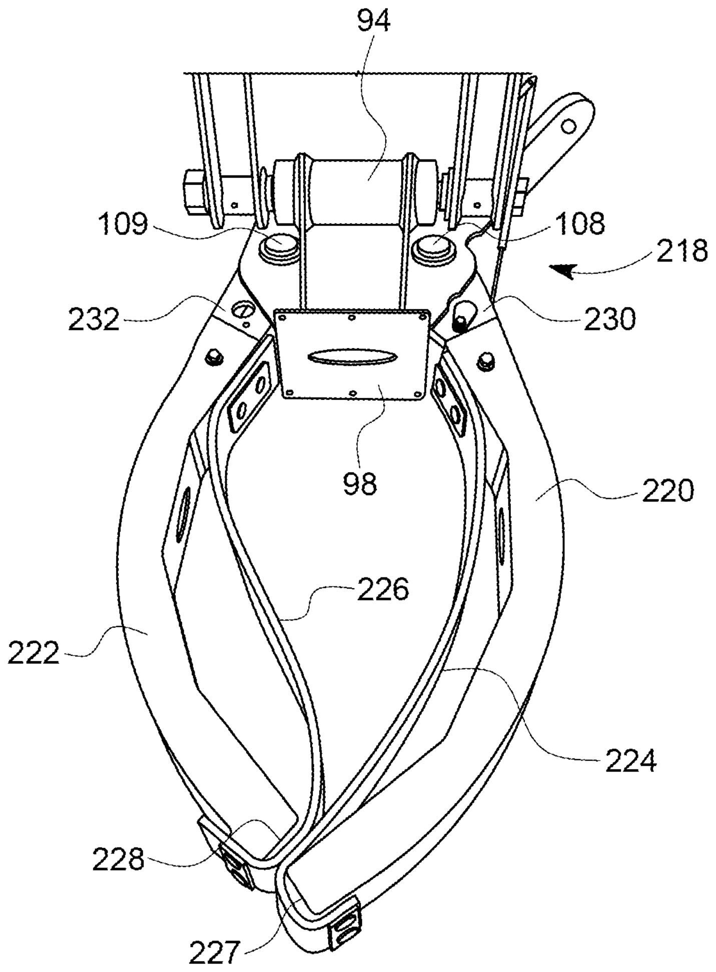
FIG. 12 is a perspective view of an alternative embodiment of the grabber mechanism.
Figure 13:
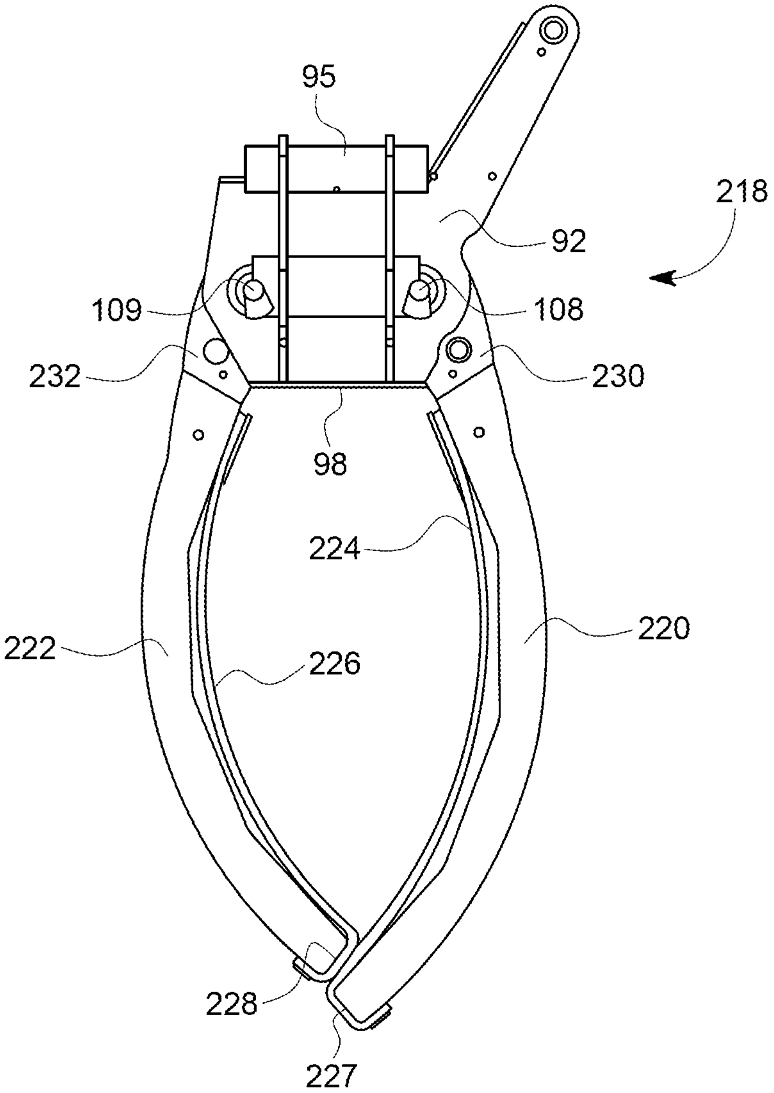
FIG. 13 is a top view of the embodiment illustrated in FIG. 12.

Referring now to FIGS. 12 & 13, an alternative or second grabber mechanism 218 is illustrated. As shown, alternative grabber mechanism 218 includes a first grabber finger 220 and a second grabber finger 222, both of which are hingedly coupled to grabber bracket 92. Here, first grabber finger 220 and second grabber finger 222 are mismatched, which will provide enhanced functionality. Similar to the grabber mechanism 90 discussed above, first grabber finger 220 of second grabber mechanism 218 is configured to rotate about a first axis which is positioned on grabber brackets 92, while second grabber finger 222 is configured to rotate about a second axis. In the illustrated embodiment, the first axis and the second axis are parallel to and spaced apart from one another.

Coupled to first grabber finger 220 is a first resilient member 224, while a second resilient member 226 is similarly coupled to second grabber finger 222. As is generally illustrated in FIGS. 12 & 13, first grabber finger 220 is longer than second grabber finger 22. This unequal length creates a mismatched pair, which adds additional functionality to second grabber mechanism 218. In the embodiment illustrated in FIGS. 11 & 12, second grabber mechanism 218 is configured to be substantially the same as first grabber mechanism 90 (as illustrated in FIGS. 1-11). Additional similarities are shown in the FIGS., such as second grabber mechanism 218 includes a first gear structure 101 (as shown in FIG. 10) coupled to first finger 220, and a second gear structure 103 (also shown in FIG. 10) is coupled to second finger 222. Further, it will be understood by those skilled in the art that first resilient member 224 and second resilient member 226 are sized to provide slight amounts of "play", and to allow these components to conform to containers when they are retrieved. Further details regarding this function are described in additional detail below.

As shown in FIGS. 12 & 13 when first finger 220 and second finger 222 are in their contracted or closed position, a distal end 227 of first finger 220 will extend beyond or overlap a distal end 228 of second finger 222. This overlap is specifically designed to allow second grabber mechanism 218 to "grab" and retain many different sizes of containers. This structure will function similar to the human thumb and forefinger, which have a similar overlapping characteristic. In the embodiment illustrated in FIG. 13, both first finger 220 and second finger 222 are configured in a manner to be substantially curved or acuate. Here, a radius of curvature of first finger 220 is greater than a radius of curvature of second finger 220. By having mismatched radii of curvature and having first finger 220 be slightly longer than second finger 222, the desired mismatch can be achieved in a manner so that initial sections 230 and 232, respectively, exit from grabber bracket 92 at the same angles. In an alternative embodiment, the desired mismatch can be achieved by having the substantially similar radii of curvature, but different lengths. In this alternative embodiment, the orientation and angles of initial sections 230 and 232 with respect to grabber bracket 92 would be altered to achieve a preferred alignment. Those skilled in the art will recognize that many variations are possible.

Figure 14:
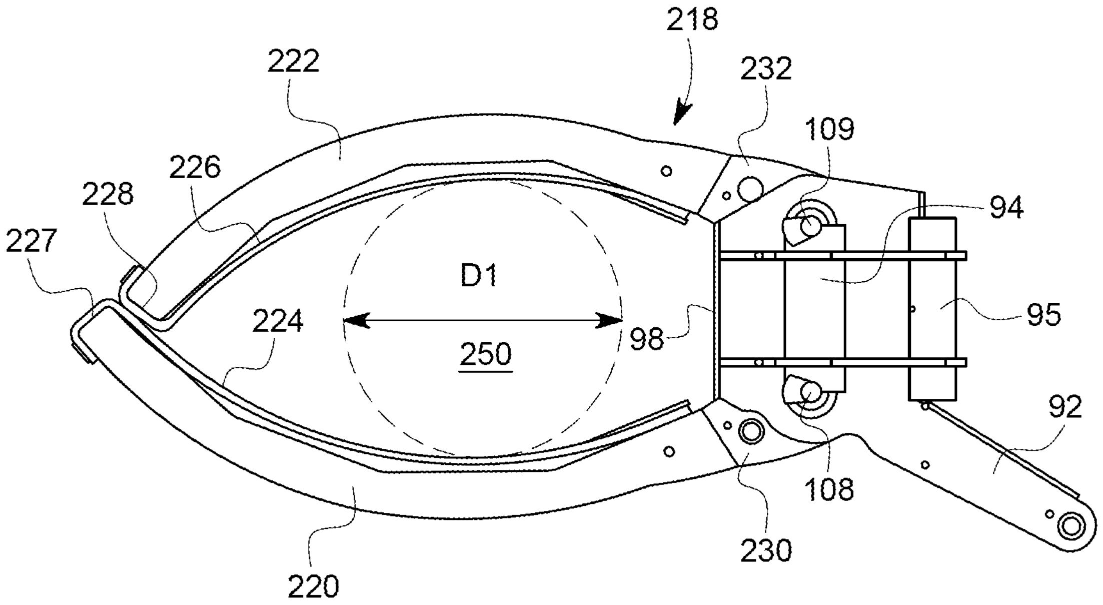
FIG. 14 is a schematic view of the grabber mechanism of FIG. 12 grabbing a first container.
Figure 15:
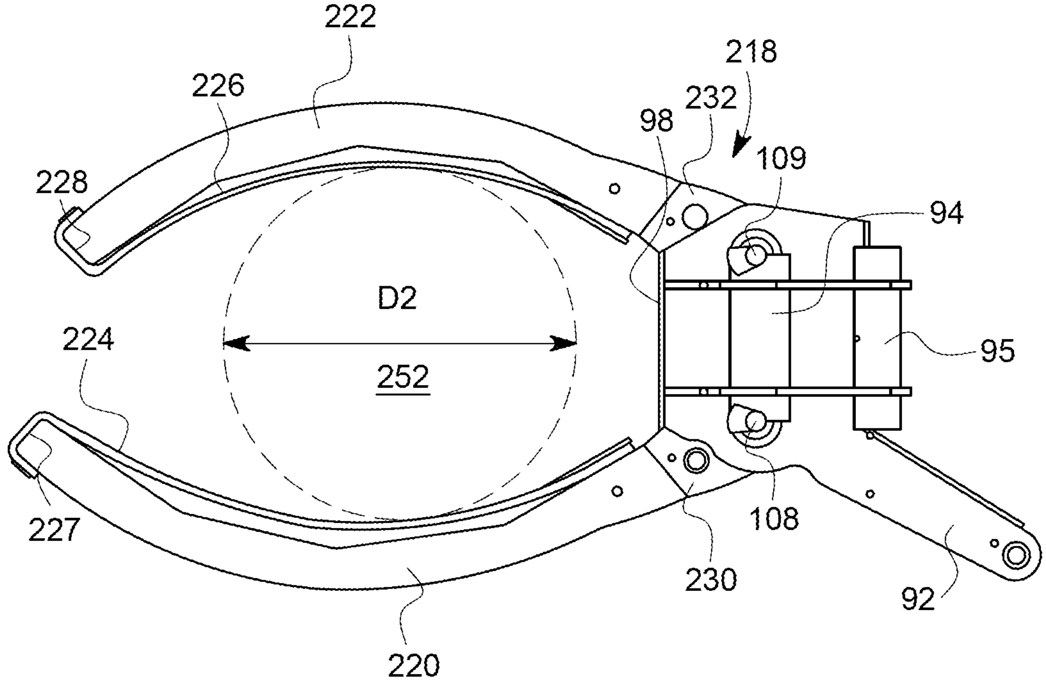
FIG. 15 is a schematic view of the grabber mechanism of FIG. 12 grabbing a second container.
Figure 16:
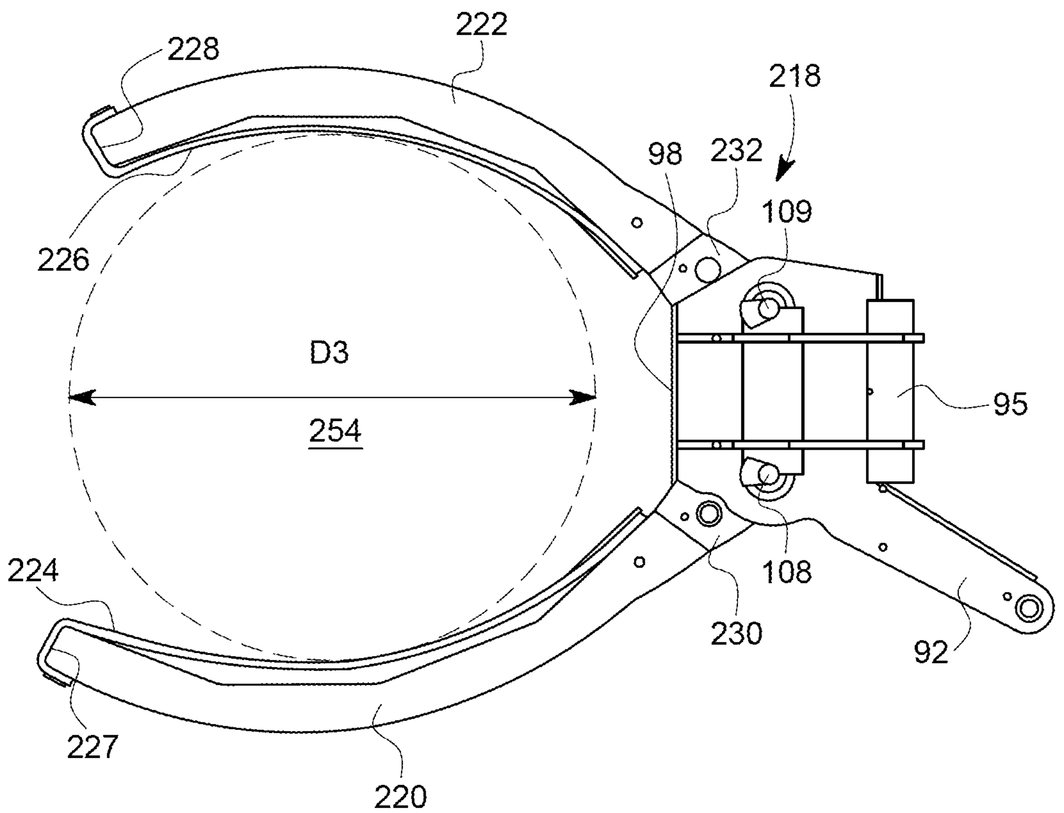
FIG. 16 is a schematic view of the grabber mechanism of FIG. 12 grabbing a third container.

Turning now to FIGS. 14-16, three examples are presented showing the beneficial operation of second grabber mechanism 218. In FIG. 14, second grabber mechanism 218 is illustrated grabbing a first container 250, which has a diameter D1. In this example, it can be seen that first grabber finger 220 and second grabber finger 222 are essentially in a "closed" position, causing distal end 227 of first finger 220 to extend beyond a overlap a distal end 228 of second finger 222 and thereby cause resilient members 224 and 226 to conform around a portion of first container 250. From this position, it will be appreciated that first container 250 can be lifted and manipulated as desired. Turning now to FIG. 15, second grabber mechanism 218 is shown holding a second container 252, which has a diameter D2. In this situation, distal end 227 of first grabber finger 220 and distal end 228 of second grabber finger 222 are positioned a distance apart from one another, but sufficiently surround second container 252 so that appropriate movement and manipulation can be achieved. Again, first resilient member 224 and second resilient member 226 will conform to second container 252 and thus support the lifting and/or manipulation of second container 252 as desired.

Referring now to FIG. 16, second grabber mechanism 218 is shown grabbing/containing a third container 254. And as shown, third container 254 had a diameter D3, which is larger than first container 250 or second container 252. In these circumstances, third container 254 clearly can be lifted or manipulated as desired.

Figure 11:
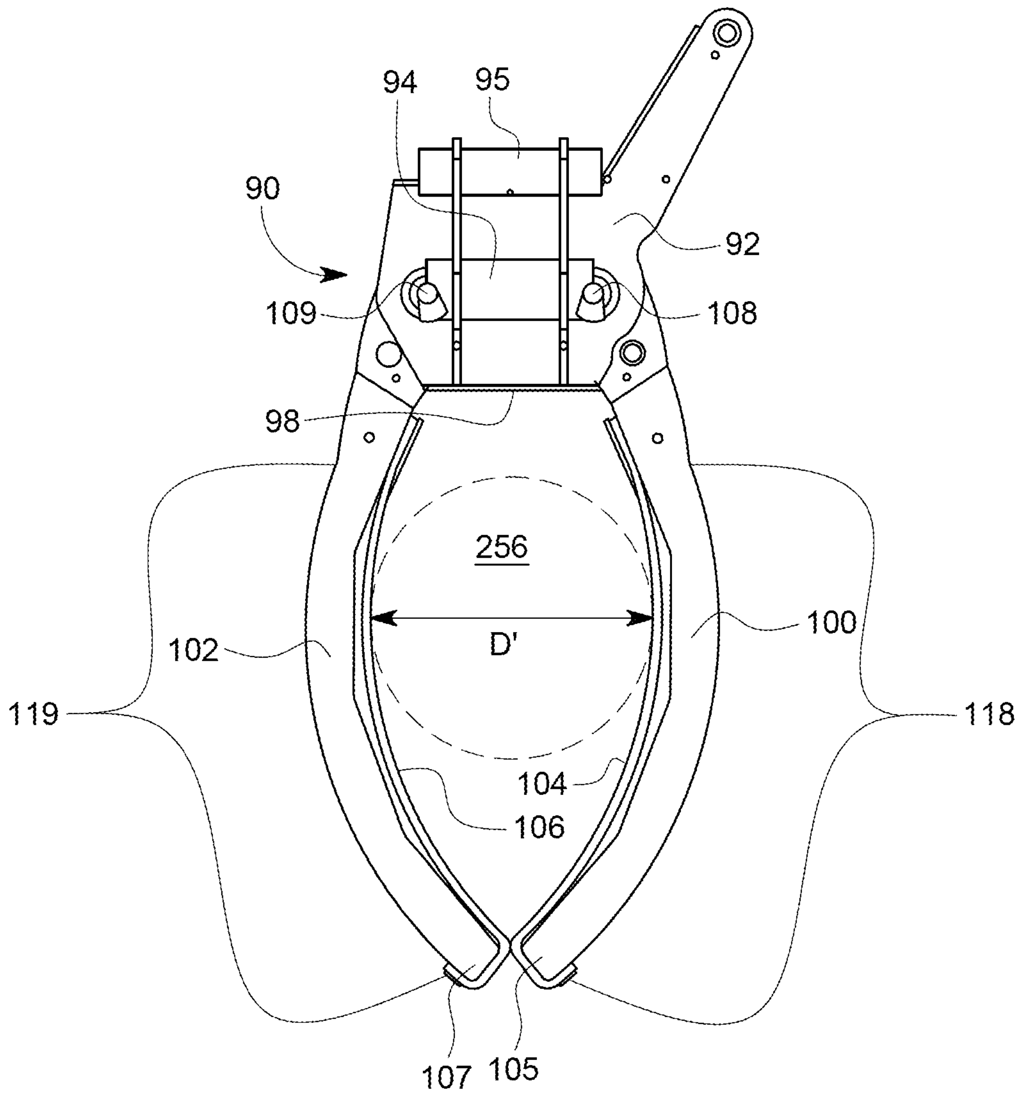
FIG. 11 is a top view of the grabber arms holding a container.

When comparing FIGS. 14-16, it can be seen that second or alternative grabber mechanism 218 is specifically configured for handling containers of variable sizes. When compared with first grabber mechanism 90, generally described above and shown in FIGS. 1-9 and 11, it is clear that this mechanism is also capable of handling containers of various sizes, but also has certain limitations. For example, based upon the arc and size that first grabber finger 100 and second grabber finger 102 it will be appreciated that smaller containers may not appropriately fit between these components. As generally illustrated in FIG. 11, when distal end 105 of first grabber finger 100 and distal end 107 of second grabber finger 102 are in contact with one another, a container with a diameter D' can be grabbed and retained at a center point of these components. The distance (D') between the first grabber finger 100 and second grabber finger 102 will essentially define the smallest container that can be grabbed and manipulated using first grabber mechanism 90. Anything smaller cannot be retained between first grabber finer 100 and second grabber finger 102. For illustration purposes, a fourth container 256 is shown in FIG. 11 which is sized between first container 250 and second container 252 illustrated in FIGS. 14 & 15.

It will be further appreciated that the geometries shown in FIG. 11 would not allow first container 250 (illustrated in FIG. 14) to be grabbed or contained by first grabber mechanism 90 since it's dimensions (i.e., diameter D1) are smaller than diameter D' of container 256 (which is also the minimum separation of first grabber finger 100 and second grabber finger 102). This physical distance provides a limit for minimum size, which first grabber mechanism 90 is capable of handling. That said, due to the mismatched fingers used in second grabber mechanism 218, smaller containers can be carried; although, the grabber fingers are substantially the same.

Figure 17:
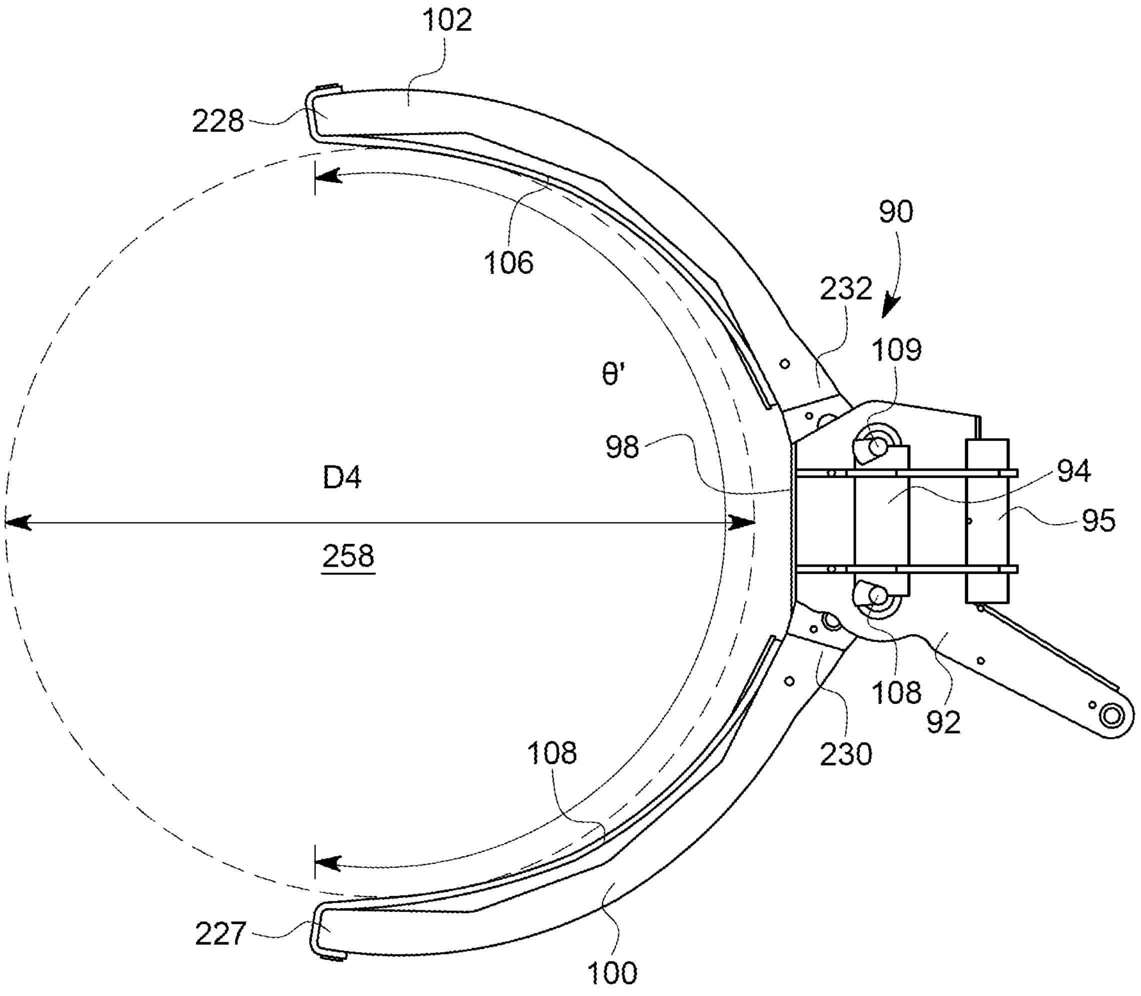
FIG. 17 is an alternative top view of the grabber mechanism shown in FIG. 9.
Figure 18:
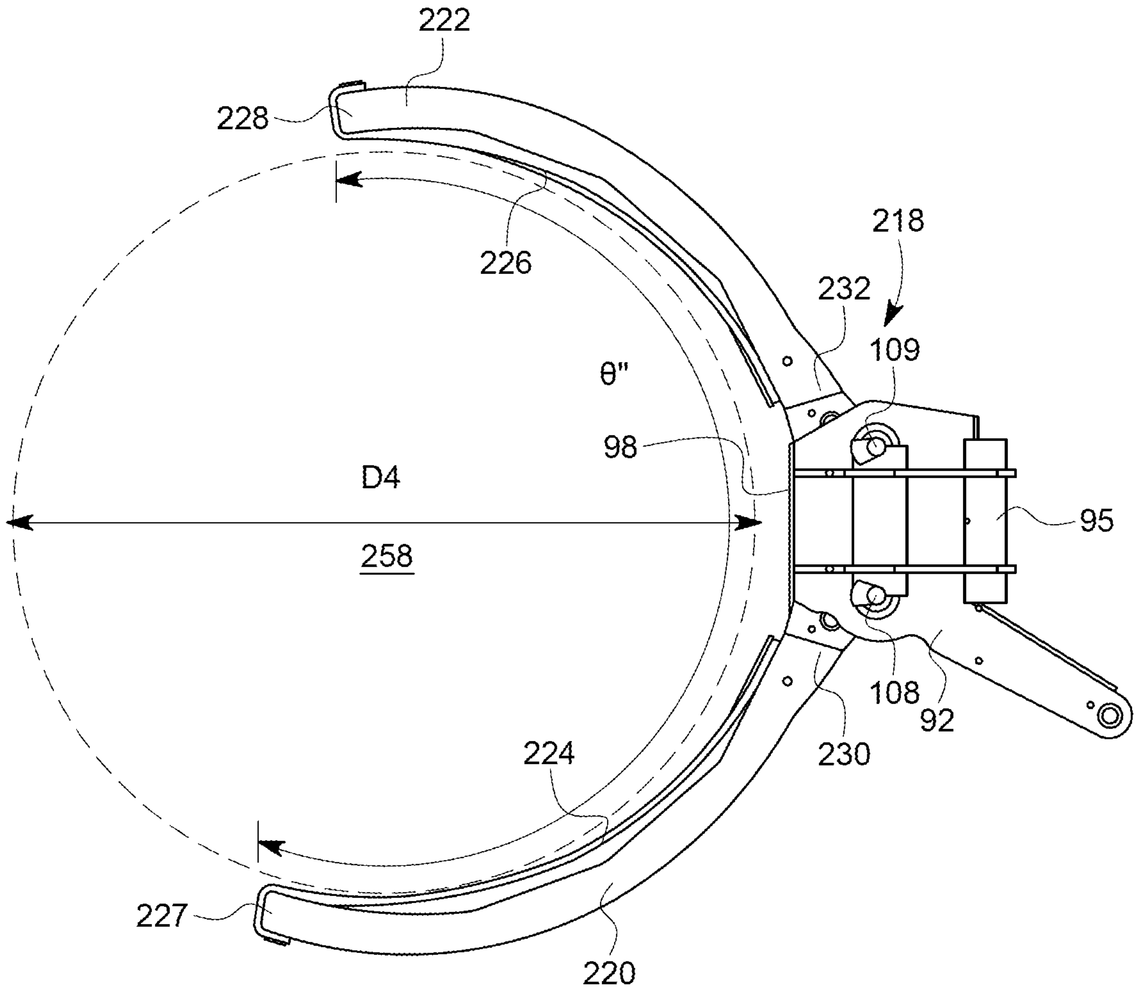
FIG. 18 is an alternative top view of the grabber mechanism shown in FIG. 12.

Mismatch fingers 220 and 222 also provide additional benefits when looking to grab larger container. Since first grabber finger 220 has a wider reach and broader coverage when at a maximum opening size, second grabber mechanism 218 can grab larger containers than first grabber mechanism 90. This concept is generally illustrated in FIGS. 17 & 18. In each of these FIGS. a fifth container 258 having a diameter D4 is illustrated. More specifically, FIG. 17 illustrates first grabber mechanism 90 attempting to grab a fifth container 258 while FIG. 18 shows second grabber mechanism 218 attempting to grab fifth container 258. Referring specifically to FIG. 17, it can be seen that first grabber finger 100 and second grabber finger 102 are able to surround a portion of fifth container 258 covering an arc θ', which in this illustration is to approximately 180°. Conversely, second grabber mechanism 218 is capable of surrounding a portion of fifth container 258 covering arc θ", which in this illustration is approximately 240°. Those skilled in the art will recognize that the ability to substantially surround a greater portion of larger fifth container 258 will provide users with additional confidence and comfort when grabbing and dumping.

It is generally understood that the grabber fingers of either first grabber mechanism 90 or second grabber mechanism 218 discussed above must surround a significant portion of a refuse container in order to appropriately and securely grab and manipulate these containers. Typically, it is desirable to have the grabber fingers surround more than 180 degrees of the circumference of a refuse container in order to appropriately handle, hold and manipulate a refuse container. With the matched grabber fingers of first grabber mechanism 90, its maximum is obtained when a first distal end 105 of first grabber finger 100, and a first and distal end 107 of second grabber finger 102 are extended so that these portions are substantially paralleled to one another. It will be recognized that the maximum handling capacity of second grabber mechanism 218 will be greater, due to the mismatch of first grabber finger 220 and second grabber finger 222.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A grabber mechanism attachable to a grabber arm which is carried by a refuse collection vehicle and configured to grab a refuse collection container, the grabber mechanism comprising:

a grabber bracket configured to be coupled to the grabber arm;

a pair of mismatched grabber fingers comprising:

a first grabber finger rotatably coupled to the grabber bracket in a manner to allow rotation about a first axis, the first grabber finger being continuous and having an arcuate portion and having a first length;

a second grabber finger rotatably coupled to the grabber bracket in a manner to allow rotation about a second axis, the second grabber finger being continuous and having an arcuate portion and having a second length which is not equal to the first length of the first grabber finger;

wherein the first axis and the second axis are parallel to one another, and wherein an inner surface of the first grabber finger is arranged to face an inner surface of the second grabber finger;

a first resilient member coupled to the inner surface of the first grabber finger; and a second resilient member coupled to the inner surface of the second grabber finger, with the first resilient member and the second resilient member configured to contact the refuse collection container when grabbed; and a drive mechanism coupled to one of the first grabber finger or the second grabber finger, and coupled to the grabber bracket in a manner to cause controlled movement of the first grabber finger and the second grabber finger.

2. The grabber mechanism of claim 1 wherein the arcuate portion of the first grabber finger is configured to have a first radius of curvature and the arcuate portion of the second grabber finger is configured to have a second radius of curvature, and wherein the first radius of curvature and the second radius of curvature are unequal.

3. The grabber mechanism of claim 2 wherein the first resilient member has a first end and a second end, wherein the first end of the first resilient member and the second end of the first resilient member are coupled to the inner surface of the first finger member and a portion of the first resilient member between the first end and the second end remain unconnected, and the second resilient member has a first end and a second end, wherein the first end of the second resilient member and the second end of the second resilient member are coupled to the inner surface of the second finger member and a portion of the second resilient member between the first end and the second end remains unconnected.

4. The grabber mechanism of claim 3 wherein the first grabber finger and the second grabber finger have an inner surface which is located on an inner portion of the arcuate portion, wherein the inner surface of the first grabber finger and the inner surface of the second grabber finger face one another, and wherein both the first grabber finger and the second grabber finger have the resilient member is coupled to be positioned adjacent the inner surface.

5. The grabber mechanism of claim 4 wherein the inner surface of the first grabber finger comprises a plurality of planar surfaces and the inner surface of the second grabber finger comprises a plurality of planar surfaces.

6. The grabber mechanism of claim 4 wherein the resilient member coupled to the first grabber finger and the resilient member coupled to the second grabber finger are formed of a reinforced rubber.

7. The grabber mechanism of claim 6 wherein the first grabber finger has a hinged end and a distal end, and the second grabber finger also has a hinged end and a distal end, wherein the resilient member coupled to the first grabber finger is attached proximate the hinged end and proximate the distal end while remaining unconnected therebetween, and the resilient member coupled to the second grabber finger is attached proximate the hinged end and proximate the distal end while remaining unconnected therebetween.

8. The grabber mechanism of claim 2 wherein the arcuate portion of the first grabber finger and the arcuate portion of the second grabber finger are continuous but segmented.

9. The grabber mechanism of claim 1 wherein the first length of the first grabber finger is greater than the second length of the second grabber finger, and wherein the first grabber finger is rotatably coupled to the grabber bracket at a hinged end, and the second grabber finger is rotatably coupled to the hinge bracket at a hinged end, and wherein a distal end of the second grabber finger will contact an intermediate portion of the first grabber finger when the grabber mechanism is in a closed position.

10. The grabber mechanism of claim 1 wherein the arcuate portion of the first grabber finger is configured to have a first radius of curvature and the arcuate portion of the second grabber finger is configured to have a second radius of curvature, and wherein the first radius of curvature and the second radius of curvature are equal.

11. The grabber mechanism of claim 1 wherein the first grabber finger and the second grabber finger each have a cooperating engagement structure configured to cause the first grabber finger and the second grabber finger to move in unison with one another in response to a moving force generated by the drive mechanism.

12. The grabber mechanism of claim 11 wherein the cooperating engagement structure comprises a meshed gear mechanism having a first gear structure operatively coupled to the first grabber finger and a second gear structure operatively coupled to the second grabber finger, wherein the first gear structure and the second gear structure are configured and positioned to mesh with one another.

13. The grabber mechanism of claim 12 wherein the drive mechanism comprises a hydraulic cylinder.

14. A grabber mechanism configured to be mounted to a refuse collection vehicle for handling refuse collection containers, the grabber mechanism comprising:

a first grabber arm having a first end and a second end, with the first end rotatably coupled to the refuse collection vehicle for rotation about a substantially horizontal extension axis;

a second grabber arm having a first end and a second end, wherein the first end of the second grabber arm is rotatably coupled to the second end of the first grabber arm to allow rotation of the first grabber arm relative to the second grabber arm about a substantially horizontal intermediate axis;

a grabber bracket rotatably coupled to the second end of the second grabber arm in a manner to allow rotation of the grabber bracket relative to the second grabber arm about a substantially horizontal bracket axis;

a first grabber finger coupled to the grabber bracket and movable between an open position and a closed position, the first grabber finger having at least one arcuate portion and a length;

a second grabber finger coupled to the grabber bracket and movable between an open position and a closed position, wherein the second grabber finger has at least one arcuate portion, and wherein the length of the first grabber finger and a length of the second grabber finger are unequal; and a drive mechanism coupled to the grabber bracket and at least the first grabber finger or the second grabber finger, the drive mechanism configured to cause controlled movement of the first grabber finger and the second grabber finger.

15. The grabber mechanism of claim 14 wherein the at least one arcuate portion of the first grabber finger has a first radius of curvature, and wherein the at least one arcuate portion of the second grabber finger has a second radius of curvature, and wherein the first radius of curvature and the second radius of curvature are unequal.

16. The grabber mechanism of claim 15 wherein the first grabber finger and the second grabber finger each have a cooperating engagement structure thereon configured to cause the first grabber finger and the second grabber finger to move in unison with one another.

17. The grabber mechanism of claim 16 wherein the cooperating engagement structure comprises a first gear structure operatively coupled to the first grabber finger and a second gear structure operatively coupled to the second grabber finger, wherein the first gear structure and the second gear structure are configured and positioned to mesh with one another.

18. The grabber mechanism of claim 15 further comprising a first resilient member coupled to the first grabber finger at a location adjacent an inner portion of the arcuate portion, and a second resilient member coupled to the second grabber finger at a location adjacent an inner portion of the arcuate portion.

* * * * *